Nov. 6, 1951  R. E. CLAPP  2,574,433
SYSTEM FOR DIRECTIONAL INTERCHANGE OF ENERGY BETWEEN
WAVE GUIDES AND FREE SPACE
Filed Oct. 1, 1943  2 SHEETS—SHEET 1
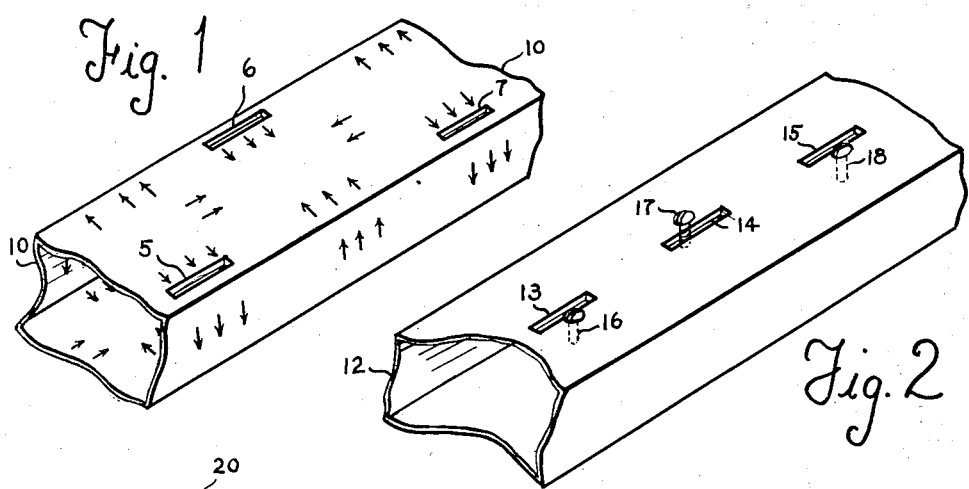
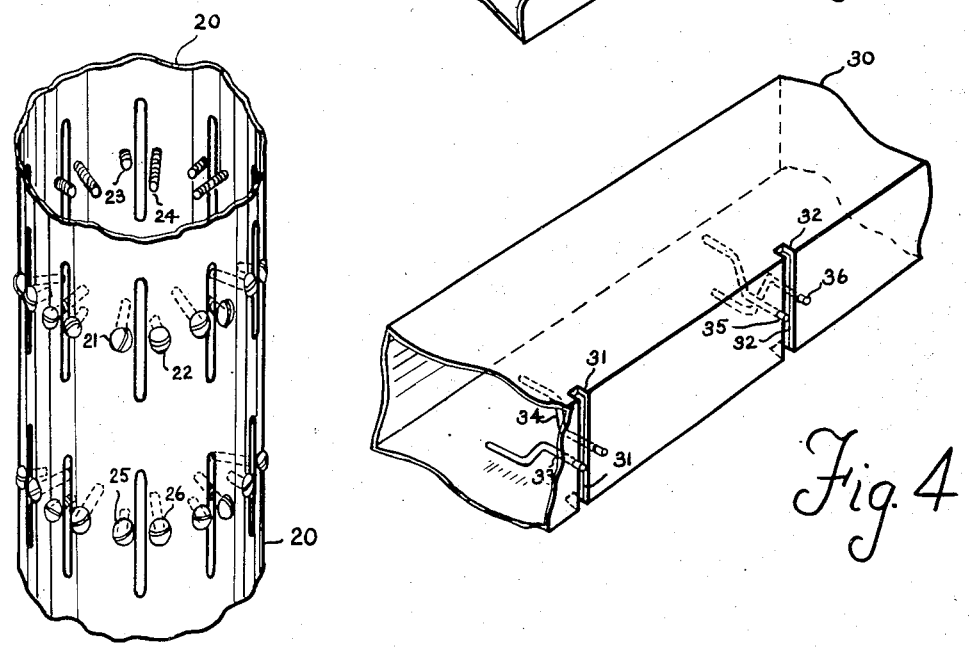
INVENTOR.
Roger E. Clapp
BY
ATTORNEY Nov. 6, 1951     R. E. CLAPP     2,574,433
SYSTEM FOR DIRECTIONAL INTERCHANGE OF ENERGY BETWEEN
WAVE GUIDES AND FREE SPACE Filed Oct. 1, 1943     2 SHEETS—SHEET 2

INVENTOR
ROGER E. CLAPP

BY

ATTORNEY

Patented Nov. 6, 1951

2,574,433

UNITED STATES PATENT OFFICE 2,574,433

SYSTEM FOR DIRECTIONAL INTERCHANGE OF ENERGY BETWEEN WAVE GUIDES AND FREE SPACE

Roger E. Clapp, Cambridge, Mass., assignor, by mesne assignments, to the United States of America as represented by the Secretary of the Navy Application October 1, 1943, Serial No. 504,638

36 Claims. (Cl. 250—33.63)

This invention concerns wave guide structures for high-frequency electromagnetic waves which are adapted for interchange of energy between a wave guide and surrounding space with the production of sharply directive and preferably unambiguous and controllable characteristics. More particularly the invention concerns wave guides adapted for interchange of energy with surrounding space through systems of slots. The invention relates equally to the coaxial-conductor and hollow pipe types of wave guides.

In the past, antenna systems consisting of slotted wave guides having relatively sharp directive properties have involved certain difficulties. It is desirable in such systems to space the slots by a distance of the order of one-half of the wave length in the guide, which requires some arrangement for reversing the phase of alternate antenna elements or slots in order that the phase difference between successive antennas may be reasonably small or even zero, as explained in the patent application of L. W. Alvarez, Serial No. 509,790, filed November 10, 1943, for Antenna Systems With Variable Directional Characteristics. As mentioned in the said patent application, this difficulty can be overcome by providing a series of dipoles with alternately reversed connections mounted on small branch wave guides, but the construction of the branch wave guides and of the dipoles involves a certain amount of complication and expense which it is desirable to avoid, especially for apparatus functioning at relatively short wave lengths such as 3 centimeters, where such structure involves relatively fine work and accurate dimensioning of the various parts. I have found means for modifying the slotted wave guide structure so that slotted wave guides having approximately two slots per wave length in the guide and having desirable directive properties can be manufactured which are relatively simple in construction.

The operation of wave guide structures in accordance with the present invention will be understood with reference to the drawings, in which:

Fig. 1 is a perspective view of a portion of a form of slotted wave guide heretofore known, broken off at both ends;

Fig. 2 is a perspective view of a portion of one form of improved slotted wave guide structure of my invention, broken off at both ends;

Fig. 3 is a perspective view, likewise broken off, of another form of slotted wave guide structure in accordance with this invention;

Fig. 4 is a perspective view again broken off, of still another form of improved slotted wave guide structure of this invention.

Figure 3A:
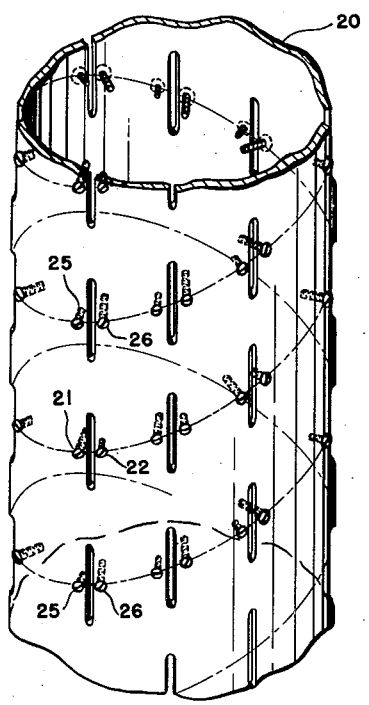
Fig. 3a is a perspective view of a portion of a modified form of the structure of Fig. 3.

The slots 5, 6, and 7 in the upper broad wall of the wave guide 10 shown in Fig. 1 alternate in position from one side of the wave guide to the other, as shown. This lateral shifting of the alternate members of the longitudinal series of slots constitutes the means previously devised to obtain small or even zero (according to the spacing) phase difference between successive slots, with spacings of the order of one-half of the wave length in the guide. It will be seen from the arrows on Fig. 1, which indicate the direction of flow of circulating current on the wave guide walls for some given instant, how this lateral shift operates to provide the desired phasing of the waves propagated through the slots. One difficulty experienced with an arrangement such as that shown in Fig. 1 is that the lateral displacement of the slots disturbs the directive pattern of the device considered as an antenna system.

Fig. 2 illustrates how in accordance with this invention a slotted wave guide may be provided in which the desired phasing of the waves propagated through the slots may be obtained while the slots are arranged in a straight longitudinal line. In Fig. 2 the wave guide is shown at 12 and slots at 13, 14, and 15. In the immediate neighborhood of the center of each slot, at one side thereof, is provided a metallic projection extending vertically into the wave guide, which projection may be a machine screw as shown at 16, 17, and 18. The use of machine screws for such projections provides convenient adjustability, although fixed projections soldered to the wave guide might involve smaller losses.

The screws 16, 17, and 18 act to displace the effective center of the wave guide. By the effective center it is here meant the place where the oppositely directed lateral circulating currents alternately meet and diverge. At the location of the screws, the position of the screw itself appears to be this effective center. It follows that if the longitudinal spacing between slot centers is one-half of the wave length in the wave guide, the waves propagated from the slots will be in phase (with respect to time). For other even spacings of the general order of magnitude of a half-wave length, there will be a progressive shift in phase between successive slots, as may be desired for particular directive properties, in accordance with principles well-known in the art.

The effective center as above defined might also be displaced, with similar results, by a rod of polystyrene or the like extending into or across the wave guide at one side of the middle of each slot, instead of a screw. Still another possible way of displacing the effective center is by means of a short-circuiting diaphragm transverse to the wave guide at one side of the middle of the slot. The short-circuiting diaphragm appears to add inductance across the wave guide at the location of the slots, however, while the projecting screws or dielectric rods appear to add capacitance. In order to compensate for the reactive effect of the rods or screws, therefore, the slots should be made shorter than the length which by itself would produce resonance and would present a pure resistance coupled to the wave guide, whereas in the other case the slots should be made longer than such normal resonant length in order to compensate for the reactive loading of diaphragms used to displace the effective center of the wave guide. For this reason projecting screws and rods may be preferred over short-circuiting shunt elements, it being possible to employ shorter slots when screws or rods are used. Screws and rods are also more readily adjustable than short-circuiting diaphragms, although the latter may be made adjustable by providing means for varying the extent to which the short-circuiting diaphragm approaches edgewise to the center of the wave guide.

Figure 2A:
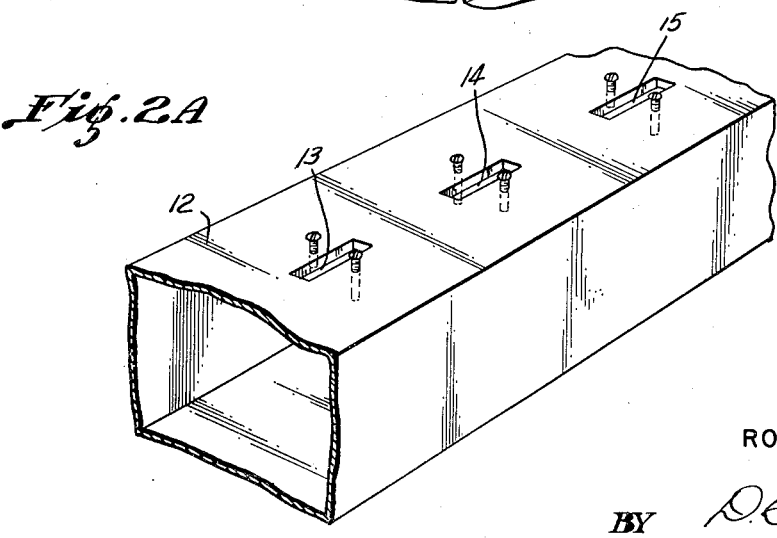
Fig. 2a is a perspective view of a portion of a modified form of the structure of Fig. 2.

It is not usually practical to provide adjustments for the length of the slots, which is more conveniently made fixed. Consequently the tuning out of reactive effects is more practically obtained by varying compensating shunt reactances associated with the slots. This could be done in the apparatus of Fig. 2 by varying the degree of insertion of the screws 16, 17 and 18, but this would at the same time vary the excitation of the slots, which might not be desirable, since an independent adjustment of these two factors would in many cases be useful. In consequence, it is desirable to employ two screws at each slot, one on each side of the middle or each slot, one screw of each pair associated with each slot being substantially longer than the other. In this manner simultaneous adjustment in the same direction of the insertion of both screws of a pair is adapted to serve to tune out the reactive effect of the slot upon transmission in the wave guide, and adjustment of the relative insertion of one screw of the pair with respect to that of the other is adapted to adjust the excitation of the slot. The latter arrangement is illustrated in Fig. 2a.

Another advantage in the use of two screws rather than a single screw lies in the fact that the outside of the wave guide may thereby be made symmetrical. It is desired in apparatus of the present invention to displace the effective electrical center of the inside of the wave guide, but not to displace the effective center of the slots as viewed from the outside, from the standpoint of radiation or reception of radiant energy. The apparatus of Fig. 2 may have a slight disturbance of the radiation pattern on account of the asymmetry of the outside of the slot structure, just as if instead of the slots a series of dipoles were used having one arm longer than the other, the orientation of the longer arm being alternated along the array. The disturbance of the radiation pattern in the apparatus of Fig. 2 is far less than that which occurs in apparatus such as that of Fig. 1, but it is nevertheless sufficiently appreciable so that for extremely sharp beams it is preferable not only to employ two screws at each slot, as shown in Fig. 2a, but also to take care that the outward projection of the two screws of any pair, on the outside of the wave guide, will be substantially equal and to rely upon differences in the length of these screws rather than upon differences in the relative degree of insertion of the screws for control of the excitation. In this case both screws of any pair might still be advanced into or retracted from the wave guide simultaneously in order to tune out the reactive effect of the slots with respect to the wave guide. The use of two screws with each slot in accordance with the principle just outlined is also illustrated in Fig. 3, which also shows the association of modified slots in accordance with this invention to form a special type of radiating and receiving apparatus for electromagnetic waves.

The wave guide 20 shown in Fig. 3 is of the cylindrical type and it is adopted by reason of its dimensions, in accordance with well-known principles, to transmit electric waves in the $E_0$ of $TM_{0,1}$ mode of transmission. When operating in this mode, the walls of the wave guide 20 will normally have longitudinal oscillating currents, but no transverse oscillating currents, as contrasted with the $H_{0,1}$ or $TE_{0,1}$ mode in a rectangular wave guide, which was considered in connection with Figs. 1 and 2, where both longitudinal and transverse currents are found. The purpose of the apparatus shown in part in Fig. 3 is to provide a slotted wave guide antenna system which is substantially non-directional in the horizontal plane but which is relatively sharply directional (to a controllable extent, if desired) in the vertical plane, and, moreover, in which the waves are horizontally polarized (polarization being defined in the sense used in the radio art rather than in the optical sense, and referring here to the direction of the electric vector rather than that of the magnetic vector). The slots are consequently longitudinally oriented in a series of lateral rings each containing a number of parallel slots, as shown in Fig. 3. The spacing between successive rings of slots, measured between central planes, is designed to provide the desired phase difference, and if a zero phase difference is desired, the spacing should be one-half of the wave length in the wave guide 20.

In order that radiation in appreciable amounts may pass through the slots, the electric field of the waves in the wave guide is distorted in the neighborhood of the centers of the slots by means of screws such as the screws 21, 22, 23, 24, 25, and 26, extending radially into the wave guide 20, as shown in Fig. 3. These screws change the otherwise uniform circumferential distribution of the electric field intensity by concentrating the electric field in the neighborhood of the screws, incidentally causing some transverse current to take place and consequently setting up horizontal electric fields across these slots. It is to be noted that the transverse currents and the horizontal electric fields across the slots occur only if the components of a pair of screws associated with a given slot extend unequally into the wave guide 20. Consequently, the screws associated with the slots are arranged in unequal pairs, one short screw and one long screw being associated with each slot. Thus the screws 22, 23 and 25 are short and extend a relatively small distance into the wave guide 20 while the screws 21, 24 and 26 are long and extend a relatively greater distance into the wave guide 20.

The direction and intensity of the transverse electric field across the slot is determined by the difference in the length of the screws associated with the slot extending into the wave guide 20, while the sum of the effect of the two screws associated with any given slot acts to counteract the reactive effect of the slot resulting from the slot being shorter than half of the free-space wave length and may be varied in order to tune out the said reactive effect at the frequency of operation. In order to provide the proper phasing between successive rings of slots, in accordance with the principles above mentioned, the positions of the long and short screws associated with the slots of one ring are reversed with respect to the positions of the long and short screws associated with the slots of the next succeeding ring in either longitudinal direction, as may be observed from examination of Fig. 3.

Instead of the arrangement of slots shown in Fig. 3, in which the slots are arranged in a series of rings, the arrangement disclosed in Fig. 3a may be used in which the slots are arranged in the two branches of a double helix. The longitudinal spacing between the slots of the two branches of the helix, as measured in a direction parallel to the axis of the cylindrical wave guide 20, is less than the free-space wave-length of the energy radiated by the antenna. The position of the screws associated with the slots of one helix, for example, screws 25 and 26, are reversed with respect to the screws associated with the slots of the other helix of the double helix, for example, screws 21 and 22. Thus each longitudinal array of slots may be properly phased in accordance with the principles above discussed. In this type of arrangement the radiation in different directions will not be in phase, which is not particularly important, but the advantage will be obtained that the provisions of a staggering of the coupling probes in the feed wave guide will make a better impedance match to the antenna system possible, by reducing the amplitude of standing waves in the feed wave guide. Frequency-sensitivity of the antenna system may also be reduced by this arrangement.

The arrangement of Fig. 3 is also adapted for utilization in connection with a coaxial-conductor wave guide for the production of essentially the same type of radiation pattern, the chief difference in such case being the insertion of a central conductor in the pipe 20. In general it will also be desirable to reduce the diameter of the pipe 20 and consequently the number of slots constituting each ring of slots. For an apparatus employing the $TM_{0,1}$ hollow-pipe mode of transmission, a certain minimum diameter of the pipe, dependent upon the frequency, is necessary, as is well known. For the normal mode of a coaxial-conductor wave guide, however, smaller diameters of the outer conductor may be used and indeed it is usually preferred to work with outer conductors of sufficiently small diameter so that only the normal mode may be transmitted. The normal mode in a coaxial-cylinder wave guide and the $TM_{0,1}$ mode in a cylindrical pipe wave guide produce substantially the same effect in the neighborhood of the walls of the outer conductor of the former and the sole conductor of the latter, so that the behavior of the slots and their associated radial projections is substantially the same in both cases. If desired, outward projections may be mounted on the outside of the cylindrical wave guide between the slots to assist radiation from the slots, especially in the case of a coaxial-conductor wave guide with a relatively small even number of slots in each ring.

If a coaxial-conductor wave guide is used with either air or solid dielectric, or partly each, the longitudinal spacing between slot centers may be as much as one wavelength in the wave guide, since such wavelength is not longer than the wave-length in free space. For longitudinal spacings between centers of the order of one wavelength the screws of successive slot rings will be similarly placed (non-reversed array) instead of oppositely placed (reversed array). In general longitudinal spacing approaching half of the wavelength in the guide, with a reversed array excitation of the slots is preferred even for coaxial conductor guides.

When it is desired to provide radiation through slots in a wave guide which are located in a portion of the wave guide wall in the neighborhood of which there is substantially no component of the oscillating electric field perpendicular to the wave guide wall and the electric field approaches zero towards such walls of the wave guide, the above-mentioned and described procedure is to be modified in the manner generally illustrated in Fig. 4. In Fig. 4 a wave guide 30 of the usual rectangular type intended to be excited in the $TE_{0,1}$ mode is shown. It is desirable to obtain radiation from transverse slots 31 and 32 cut in one of the narrower walls of the wave guide (in order to obtain radiation polarized in a direction parallel with the axis of the wave guide).

Rods 33, 34, 35 and 36 extending into the wave guide, are again associated with the slots but since extension into the wave guide perpendicular to the narrow wall is ineffective to couple with the electric field, which is directed parallel to the narrow wall of the wave guide, the aforesaid rods are bent after they have extended sufficiently far into the wave guide to reach a point where a substantial oscillating electric field exists. In this case it is possible, and indeed desirable, to obtain a balanced differential effect by bending the rods 33 and 34 associated with the slot 31 in opposite directions, the rod 33 being bent towards the bottom of the wave guide and the rod 34 towards the top of the wave guide. In order to increase the amount of energy abstracted from the wave guide and also to reduce the danger of breakdown under high power operation, the inner end of the rods 33 and 34, and likewise of the rods 35 and 36, are again bent parallel to the broad walls of the wave guide (perpendicular to the narrow walls). At the same time the rods 33 and 34 will provide a reactive loading on the slot and thereby permit the use of a relatively short slot by compensating the inductive effect of such a slot. The length of the slot may be still further diminished by increasing its width at its ends, giving it a "dumbbell" shape. Preferably these rods make no contact with the broad walls, thereby permitting adjustment of the insertion of the rods without introducing contact difficulties. It is desirable to keep the slot 31 fairly short because the greater extension of the slot into the broad walls of the wave guide would intercept longitudinal oscillatory currents which would disturb the operation of any array of the "reversed" type because these longitudinal oscillatory currents would assist the excitation of some slots and counteract the excitation of others, requiring additional measures of compensation and other difficulties.

It will be noted that the directions in which the rods 35 and 36, associated with the slot 32, are bent are the opposite respectively of the directions in which the rods 33 and 34, associated with the slot 31, are bent, thus providing desired phasing of the radiation proceeding from the slots when the wave guide is operated in the normal mode, as above described. Because the intensity of the electric field in the normal mode is greater at the center of the wave guide and diminishes towards the narrow walls, the excitation of the slots may be varied by the extent to which the rods 33 and 34 are inserted. Rotation of the rods may also be used as an adjustment if desired. As previously suggested, it is desirable that the extension of the rods outside of the wave guide should be symmetrical with respect to the slot with which the rods are associated, so that it is desirable, once a suitable adjustment has been made, to solder the rods into the narrow wall of the wave guide in the desired position and then, if necessary, to trim off the outward extensions of these rods either entirely or at a predetermined length.

In some case it may be desirable, in connection with the use of apparatus of any of the forms here described or of other possible forms of this invention, to provide means for varying the wave length in the wave guide in order to control or vary the orientation of the maximum directivity of the system. It is to be understood that various means may be provided for that purpose, such as means for varying the longer transverse dimension of a rectangular wave guide, means for variably introducing masses of solid dielectric material such as polystyrene into a wave guide, and so on. Some forms of means of varying the wave length in a wave guide are shown in the aforesaid patent application of L. W. Alvarez and others are illustrated in my copending patent application Serial Number 520,648, filed February 1, 1944, now Patent Number 2,527,477, granted October 24, 1950, for Control of the Velocity of Phase Propagation of Electric Waves in Wave Guides.

What I desire to claim and obtain by Letters Patent is:

1. A wave guide for high-frequency electric waves adapted for interchange of energy with surrounding space including a tubular metallic wave-guiding wall having a plurality of longitudinally spaced slots therein, said electric waves except for features hereafter specified in this claim producing a symmetrical electromagnetic field within said wave guide such that substantially no electric field is adapted to be excited across said slots when said wave guide is operating in a desired mode, and metallic projections mounted on said wall near said slots and equidistant from the ends thereof, extending into said wave guide, and proportioned to provide asymmetry of said electromagnetic field at each of said slots in a direction perpendicular to the orientation of the respective slots.

2. A wave guide for high-frequency electric waves adapted for interchange of energy with surrounding space including a tubular metallic wave-guiding wall having a plurality of longitudinally oriented slots therein at locations where transverse currents are not adapted to flow in said wall when said wave guide is operating in a desired mode except for features hereafter specified in this claim, and at least one metallic projection, mounted on said wall near the middle of each of said slots and extending into said wave guide, said projections being proportioned to provide transverse asymmetry of said currents in the neighborhood of said slots.

3. A wave guide in accordance with claim 2 in which the extent to which each of said projections penetrates into said wave guide is adjustable and may be varied from outside of said wave guide.

4. A wave guide in accordance with claim 2 in which the longitudinal spacing between slots, measured between centers of the slots, is equal to one-half of the wave length in the wave guide for a desired frequency of operation and in which successive longitudinal slots are provided with projections as specified in claim 2 but so arranged that the asymmetry referred to in claim 2 is in opposite directions for successive longitudinally spaced slots.

5. A wave guide for high-frequency electric waves adapted for interchange of energy with surrounding space with the production of relatively sharp directive characteristics, said wave guide including a tubular metallic wave-guiding wall adapted to be excited in the $TE_{0,1}$ mode at a desired frequency of operation and having a series of longitudinal slots arranged in a substantially straight line, said line being so located on said wave guide that except for features hereafter specified in this claim substantially no electric field is adapted to be excited across said slots when said wave guide is operating in the said mode, and a projection extending into said wave guide located near the middle of each of said slots, the said projections associated with successive slots being located on opposite sides of said slot, said projections being adapted to displace the minimum point of the transverse voltage wave in said tubular metallic wall when said wave guide is excited and thereby to provide for flow of electric wave energy between said wave guide and surrounding space.

6. A wave guide for high-frequency electric waves adapted for interchange of energy with surrounding space with the production of directive characteristics, including a tubular metallic wave-guiding wall having a series of longitudinally spaced slots therein, said series being arranged in substantially a straight line, such straight line being so located that except for features hereinafter specified in this claim substantially no electric field is adapted to be excited across said slots when said wave guide is operating in a desired mode, and two metallic projections extending into said wave guide mounted on said wall near the middle of each of said slots, said metallic projections being adjustable as to the extent of their penetration into said wave guide and located one on each side of each of said slots, whereby said slots are adapted to be tuned to resonance at a desired frequency with relatively little effect on the coupling through said slots by simultaneous variation in the same direction of the penetration of said projections into said wave guide, and the degree of coupling between said wave guide and surrounding space through each of said slots is adjustable with relatively little effect upon the tuning of said slots by varying the difference between the penetration into said wave guide of the two projections associated with each of said slots.

7. A wave guide for high-frequency electric waves adapted for interchange of energy with surrounding space including a tubular metallic wave-guiding wall of rectangular cross section adapted to transmit oscillation at a desired frequency in the TE$_{0,1}$ mode, said wall having in one of its narrow faces a series of transverse slots extending completely across said narrow face, and metallic projections near the middle of each of said slots extending into said wave guide and bent for coupling with the oscillatory field thereof in a manner adapted to excite said slots, corresponding projections associated with successive slots being bent in opposite directions in order to provide a phase reversal in the excitation of successive slots.

8. A wave guide for high-frequency electric waves adapted for interchange of energy with surrounding space including a tubular metallic wave-guiding wall having a plurality of longitudinally spaced slots therein, said electric waves except for means hereinafter specified in this claim producing a symmetrical electric field within said wave guide such that substantially no electric field is adapted to be excited across said slots when said wave guide is operating in a normal mode, and a plurality of projections mounted on said wave-guiding wall at positions near the middle of each of said slots with respect to the longitudinal dimension of said wave guide, asymmetrically located with respect to each of said slots, extending into said wave guide and adapted to provide a minimum point of the transverse voltage wave within said wave-guiding wall at one side of said slots and arranged to provide said minimum point on alternate sides of succeeding longitudinally spaced slots.

9. A slotted wave guide system for high-frequency electric waves adapted for interchange of energy with surrounding space with the production of relatively uniform circumferential directivity and relatively sharp axial directivity, said slotted wave guide system including a cylindrical metallic wave-guiding wall having a plurality of longitudinal slots therein arranged in the two branches of a double helix, said metallic wall being of a dimension adapted for the transmission of high-frequency electric waves at a desired frequency in the TM$_{0,1}$ mode, the longitudinal spacing, in directions parallel to the axis of said wall, of slots of alternate branches of said double helix being less than the free-space wave length, and at least one metallic projection near the middle of each slot extending radially into said wave guide and adapted to produce circumferential asymmetry in the oscillating electric field within said cylindrical wall in the immediate neighborhood of said slot, said projections being so located with respect to said slots that the said asymmetry produced in slots forming one branch of said double helix is circumferentially directed in the opposite sense relative to the corresponding asymmetry associated with slots of the other branch of said double helix.

10. A slotted wave guide system in accordance with claim 9 in which two of said projections are provided at each slot, one of which is longer than the other and both of which are adjustable as to the extent of radial penetration into said wave guide.

11. A wave guide radiator for high frequency electric energy, comprising a tubular metallic wave guiding wall having a plurality of slots therein and metallic projections mounted on said wall adjacent the middle of said slots and extending into said wave guide.

12. A wave guide radiator for high frequency electric energy, comprising a rectangular wave guide having a plurality of slots therein, said slots being located in a straight line along the central longitudinal axis of one broad wall of said wave guide and spaced apart between the centers of said slots a distance substantially equal to a half wave length of the energy in said guide, and metallic projections mounted on said broad wall adjacent the middle of each of said slots and extending into said wave guide.

13. A wave guide radiator for high frequency electric energy, comprising a rectangular wave guide having a plurality of slots therein, said slots being coincidental with the longitudinal axis of one of the broad walls of said wave guide and spaced apart between the centers of said slots a distance substantially equal to a half wave length of energy in said guide, and a pair of metallic projections mounted on said broad wall adjacent the middle of each of said slots and extending into said wave guide, the two said projections associated with each slot being different in length.

14. A wave guide radiator for high frequency energy comprising a circular wave guide having a plurality of longitudinal slots therein arranged in a series of lateral rings around said wave guide, said rings being spaced apart longitudinally of said guide between the centers of said slots a distance substantially equal to a half wave length of energy in said guide, and a pair of metallic projections mounted on the wall of said wave guide adjacent the middle of each of said slots and extending into said wave guide, the two said projections associated with each of said slots being different in length.

15. Apparatus in accordance with claim 14 in which the extended lengths of said projections into said wave guide are independently adjustable.

16. A wave guide radiator for high frequency electric energy, comprising a rectangular wave guide having a series of spaced transverse slots extending completely across one of the narrow walls thereof, and a pair of metallic projections near the middle of each of said slots extending into said wave guide, each of the projections of said pair comprising a rod first bent toward a broad wall of said guide and the end of the rod then bent to lie parallel to the broad walls so as to form an L-shaped member, the rods of each pair being first bent toward opposite broad walls and corresponding projections associated with successive slots being first bent in opposite directions.

17. An antenna for high frequency electric energy comprising, a tubular metallic wave guide having a plurality of energy radiating slots in the wall thereof, said slots being spaced, between centers, longitudinally of said guide, a distance equal to a half wave length of said energy, and metallic projections mounted on said wall adjacent said slots equidistant from the ends thereof and extending into said guide for independently tuning said slots.

18. An antenna for high frequency electric energy comprising, a hollow metallic wave guide having therein a plurality of energy radiating slots, said slots being spaced, between centers longitudinally of said guide, a distance equal to one-half wave length of said energy, and metallic projections mounted on said wall adjacent the middle of each of said slots and extending into said guide, said projections being independently adjustable to provide tuning of each of said slots.

19. An antenna for high frequency electric energy comprising, a rectangular wave guide having a plurality of elongated energy radiating slots therein, said slots being longitudinally disposed along the central axis of one broad wall of said wave guide, and at least one metallic projection mounted adjacent each of said slots and extending into said wave guide for tuning said slots.

20. An antenna for high frequency electric energy comprising, a rectangular wave guide having therein a plurality of independently tunable energy radiating slots longitudinally disposed along the central axis of one broad wall of said wave guide.

21. An antenna for high frequency electric energy comprising, a rectangular wave guide having therein a plurality of energy radiating slots, said slots being longitudinally disposed between centers along the central axis of one broad wall of said wave guide and being spaced between centers a distance equal to a half-wave length of said energy, and a metallic projection mounted adjacent the middle of each of said slots and extending into said wave guide.

22. Apparatus as in claim 21 wherein the extension of each of said projections into said guide are independently adjustable in length from the outside of said guide.

23. Apparatus as in claim 21 wherein the projection associated with successive ones of said slots are located on opposite sides of said slots.

24. An antenna for high frequency electric energy comprising, a rectangular wave guide having therein a plurality of energy radiating slots longitudinally disposed along the central axis of one broad wall of said wave guide, said slots being spaced between centers a distance equal to a half-wave length of said energy, and a pair of metallic projections mounted on said wall on opposite sides of each of said slots and extending into said wave guide.

25. Apparatus in accordance with claim 24 wherein the extension of each of said projections into said wave guide is independently variable in length.

26. Apparatus in accordance with claim 24 wherein the projections comprising each pair extend into said wave guide and unequal amount.

27. An antenna for high frequency electric energy comprising, a rectangular wave guide having therein a plurality of energy radiating slots longitudinally disposed along the central axis of one broad wall of said wave guide, said slots being spaced between centers a distance equal to a half-wave length of said energy, and a pair of metallic projections mounted in said wall adjacent to and on opposite sides of each of said slots, the projections comprising each pair extending unequally into said wave guide and the relative positions of the longer and shorter of said projections alternating between successive ones of said slots.

28. Apparatus in accordance with claim 27 wherein each of said projections is independently adjustable in length.

29. An antenna for high frequency energy comprising, a rectangular wave guide having a plurality of slots extending across one of the narrow walls thereof, said slots being spaced apart a distance equal to a half-wave length of said energy, and a pair of metallic projections mounted near the middle of each of said slots and extending into said wave guide.

30. Apparatus in accordance with claim 29 wherein said projections are independently movable to provide tuning of said slots.

31. Apparatus in accordance with claim 29 wherein each of the projections comprises a rod first bent toward a broad wall of said guide and the end then bent to lie parallel to the broad walls so as to form an L-shaped member, the rods of each pair being first bent toward opposite broad walls, corresponding rods associated with successive slots being first bent in opposite directions.

32. An antenna for high frequency energy comprising, a circular wave guide having a plurality of independently tunable longitudinal slots therein arranged in a series of spaced lateral rings around said wave guide, said rings being spaced apart between centers of said slots a distance equal to a half-wave length of said energy.

33. An antenna for high frequency energy comprising, a circular wave guide having a plurality of longitudinal slots therein arranged in a series of spaced rings around said wave guide, said rings being spaced apart between centers of said slots a distance equal to a half-wave length of said energy, and a pair of projections mounted on said wall adjacent and on opposite sides of each of said slots and extending into said wave guide.

34. Apparatus in accordance with claim 33 wherein the projections comprising each of said pairs are unequal in length.

35. Apparatus in accordance with claim 34 wherein the length of said projections is independently adjustable.

36. Apparatus in accordance with claim 35 wherein corresponding projections of the slots of successive rings are on opposite sides of the slot.

ROGER E. CLAPP.

REFERENCES CITED

The following references are of record in the file of this patent:

UNITED STATES PATENTS

| Number | Name | Date |
|---|---|---|
| 2,241,119 | Dallenbach | May 6, 1941 |
| 2,306,282 | Samuel | Dec. 22, 1942 |
| 2,396,044 | Fox | Mar. 5, 1946 |
| 2,414,266 | Lindenblad | Jan. 14, 1947 |
| 2,438,119 | Fox | Mar. 23, 1948 |